Patented May 6, 1952

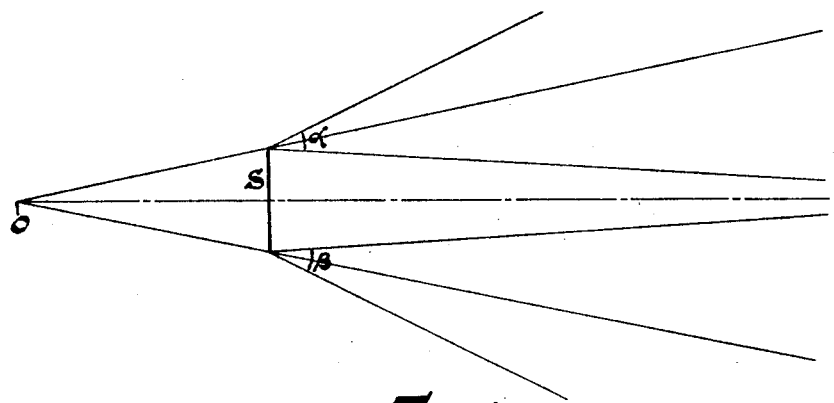
Fig. 1
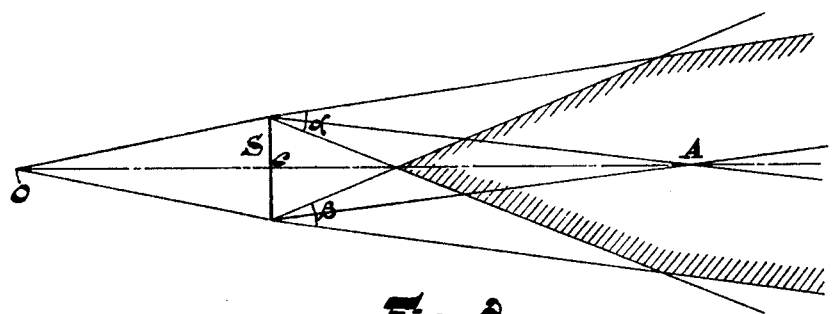
Fig. 2
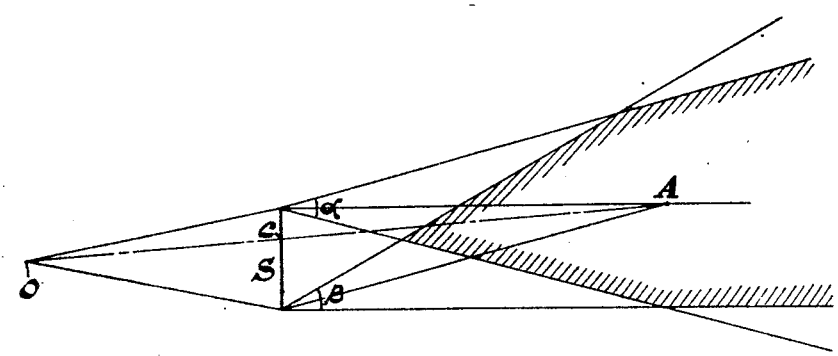
Fig. 3
INVENTOR.
Gerrit Jan Siezen
BY *Wendoroth, Lind & Ponack*
ATTORNEYS
Fig. 4

2,596,049

UNITED STATES PATENT OFFICE 2,596,049

SCREEN COMPRISING A FRESNEL SURFACE AND PROJECTION DEVICE COMPRISING SUCH A SCREEN

Gerrit Jan Siezen, Eindhoven, Netherlands, assignor to Hartford National Bank and Trust Company, Hartford, Conn., as trustee Application May 7, 1948, Serial No. 25,736
In the Netherlands June 11, 1947

3 Claims. (Cl. 88—28.93)

This invention relates to a screen of which one side exhibits the form of a Fresnel surface i. e. that it is provided with ribs having a triangular cross-section and of which the outline varies regularly in accordance with the optical axis extending in a plane at right angles to the Fresnel surface and to the direction of the groove, as a result of which the optical effect of the screen which may be flat, corresponds to that of a lens or a concave or convex mirror. Usually circular or substantially circular e. g. spiral grooves are employed, when the effect of the Fresnel surface corresponds to that of a lens or mirror having rotational symmetry. Sometimes rectilinear grooves are employed which yields the effect of a cylindrical lens or mirror.

It is known to use such a screen for improving the visibility of the images projected thereon, as will be explained herein. In order to make the images visible the screen may either consist of light-diffusing material or be furnished with a light-diffusing layer obtained, for instance, by frosting. Alternatively the screen may be transparent, in which case the images may be made visible by another adjacent screen diffusing the light. However, the screen may also be constructed as a so-called viewing screen and furnished with a reflecting e. g. slightly frosted surface.

With such screens a Fresnel surface is used in order that the directions in which the light is diffused by the different parts of the screen is formed substantially into a beam. This provides better adaptation of the space, from which the spectator watches the evenly illuminated screen picture, to the normally available spectator room. More particularly, this permits watching the even lighting up of a screen at a shorter distance.

It has been found, however, that with these known screens, a considerable part of the light flux projected thereon may also be lost.

The use of a screen according to the invention, with which the Fresnel surface extends eccentrically with respect to the screen eliminates this disadvantage.

In order that the invention may be better understood and readily carried into effect it will now be described more fully with reference to the accompanying drawing, given by way of example.

Fig. 1 represents the distribution of light with a projection screen having a Fresnel surface.

Fig. 2 illustrates the distribution of light with such a screen having a Fresnel surface; Fig. 3 illustrating the distribution of light with a screen according to the invention.

Fig. 4 is a diagrammatic section of a screen according to the invention.

For explaining the invention a television receiver is chosen by way of example. The object glass of this receiver is located at O, so that an image is projected on the screen S. This screen may, for instance, consist of a thin plate of polystyrene. The image is made visible due to this plate being frosted, it being supposed that the light is diffused within an angle of 30°.

If the screen does not exhibit a Fresnel surface, as represented in Fig. 1, the light falling on the screen near the upper and lower edge respectively, will be radiated within two cones designated $\alpha$ and $\beta$.

The image is completely visible only to the spectators within the two spatial angles $\alpha$ and $\beta$, which area extends on the right outside the figure in this case.

The well-known use of a Fresnel surface permits the light to be formed substantially into a beam, as shown in Fig. 2. The bisectors of the two angles $\alpha$ and $\beta$, also a mounting to 30°, slightly converge. Within the cross-hatched part of the space the screen is watched lighting up evenly throughout its surface. In this figure the centre C of the Fresnel surface is at the centre of the screen.

In connection with the average level of the spectator, who should be able to watch the image either seated or standing, it is necessary with this construction to arrange the screen at a comparatively high level which involves an expensive and aesthetically unsatisfactory construction of the projection apparatus.

In the construction shown in Fig. 3 it is ensured that the lower outline of the space, where the image is well visible, is approximately at the same level as the lower edge of the screen S, so that the bisector of the angle $\beta$ and the horizontal embrace an angle of 15°. In this case the position of the angle $\alpha$ is such that the bisector extends horizontally. The distribution of light illustrated in this figure is obtained by giving the centre C of the Fresnel surface a slightly higher level, notatably where the line connecting the object glass O to a point of intersection A of the bisectors of the angles $\alpha$ and $\beta$ intersects the screen S.

Thus it is possible to arrange the screen at a comparatively low level and, moreover, the image on the screen is better visible at a shorter distance to a standing spectator, which is of particular importance in tuning and setting the apparatus.

In this event the lower outline of the space, from which the spectator watches the image evenly lighting up, extends horizontally. By this embodiment of the invention it is ensured that the quantity of light lost in the lower part of the spectator room is minimized. The outline will be made to extend a little below the eye-level of a seated spectator, which level is substantially constant.

Finally Fig. 4 represents in section a construction of the screen according to the invention. The rings of the Fresnel surface, which have a substantially triangular section, are greatly exaggerated.

It is known to provide a screen having a Fresnel surface at one side, with means e. g. ribs at the other side to obtain, moreover, a certain lateral diffusion of the light. It will be appreciated that such measures may also be taken with the screen according to the invention.

What I claim is:

1. A projection system comprising a substantially vertically-disposed transparent projection screen one side of which has a Fresnel surface, said screen having predetermined vertical and horizontal dimensions, said screen being characterized in that the centre of said Fresnel surface is located above the centre of said screen a substantial distance with respect to said predetermined vertical dimension, and an objective positioned for directing rays of light against the other side of said projection screen, said objective being located on a line passing through said centre of said surface and at right angles to the main plane thereof.

2. In combination; a television receiver cabinet, a substantially vertically-disposed transparent screen mounted on said cabinet, said screen having one side thereof formed as a Fresnel surface, said screen having predetermined vertical and horizontal dimensions, said screen being characterized in that the center of said Fresnel surface is located above the center of said screen a substantial distance with respect to said predetermined vertical dimension, and an objective mounted in said cabinet and positioned for directing rays of light against the other side of said projection screen for forming an image viewable on said one side, said objective being located on a line passing through said center of said surface and at substantially right angles to the main plane thereof, said objective and said screen being so constructed and arranged that the lower outline of the space in which the image lights up evenly extends in a horizontal direction.

3. A projection system comprising a substantially vertically disposed transparent screen, a first side of which has a Fresnel surface, said screen having predetermined horizontal and vertical dimensions, an objective located on the second side of said screen on a line passing through the center of said surface and substantially at right angles to the main plane thereof for directing rays of light against the second side of said screen for forming an image viewable on said first side, said Fresnel surface having its center located eccentrically of the center of the screen and on the same side of the screen center line as the viewer.

GERRIT JAN SIEZEN.

REFERENCES CITED

The following references are of record in the file of this patent:

UNITED STATES PATENTS

| Number | Name | Date |
|---|---|---|
| 330,356 | Trotter | Nov. 10, 1885 |
| 2,115,178 | Ralph | Apr. 26, 1938 |
| 2,200,646 | Strong et al. | May 14, 1940 |
| 2,260,228 | Moller et al. | Oct. 21, 1941 |
| 2,279,555 | Browne et al. | Apr. 14, 1942 |